April 6, 1926.
L. SAIVES
1,579,335
GAS PRODUCER FOR SELF PROPELLED VEHICLES
Filed June 11, 1924
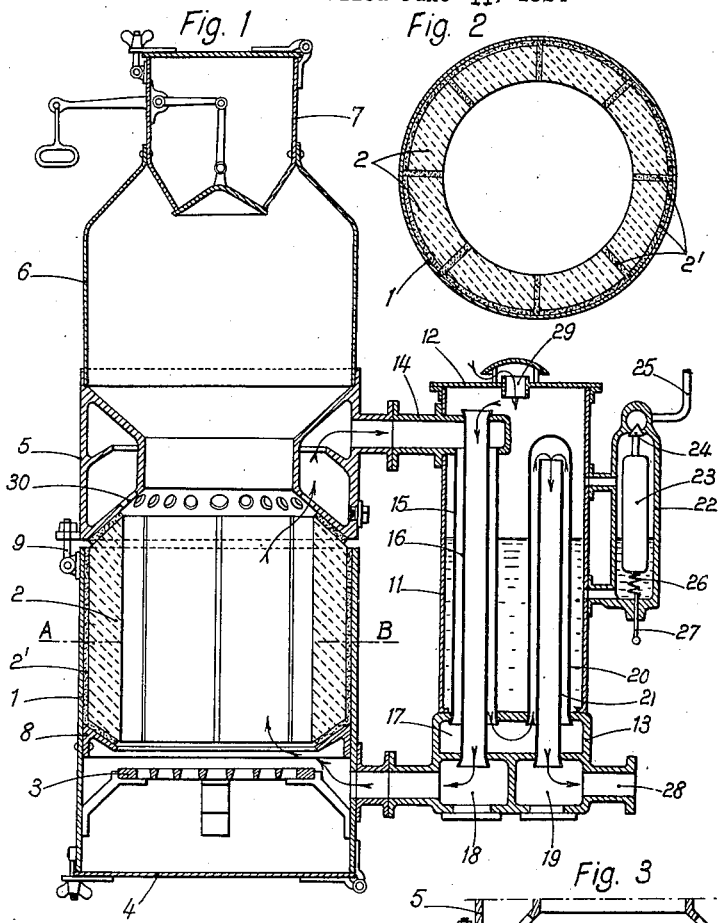
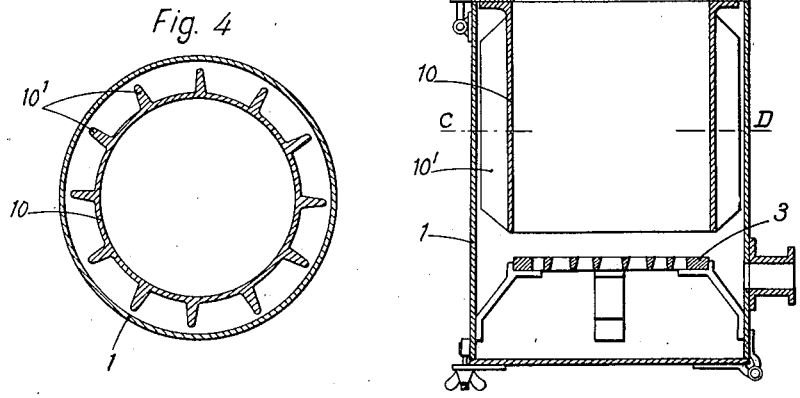
INVENTOR.
Léon Saives
By O'Neill and Bunn
Attorneys.

Patented Apr. 6, 1926.

1,579,335

UNITED STATES PATENT OFFICE.

LÉON SAIVES, OF BILLANCOURT, FRANCE, ASSIGNOR TO LOUIS RENAULT, OF BILLANCOURT, FRANCE.

GAS PRODUCER FOR SELF-PROPELLED VEHICLES.

Application filed June 11, 1924. Serial No. 719,304.

*To all whom it may concern:*

Be it known that I, LÉON SAIVES, a citizen of the French Republic, residing at Billancourt, Department of the Seine, in France, have invented certain new and useful Improvements in or Relating to Gas Producers for Self-Propelled Vehicles; and I do hereby declare the following to be a full, clear, and exact description of the invention, such as will enable others skilled in the art to which it appertains to make and use the same.

The supplying of internal combustion engines mounted on self-propelled vehicles with gas made by the distillation in a gas producer of combustible matter such as charcoal, coke, or anthracite, is extremely interesting from the point of view of economy as compared with supplying with petrol.

In order to obtain a satisfactory result the gas producer should be light, take up little room, able to stand shocks, easily operated, and adapted to regulate the quality of the gas in accordance with the atmospheric conditions of the air and the running of the engine.

The gas producer, which is the subject of the present invention has been designed to combine these different characteristics.

In the accompanying drawing:

Figure 1 is a vertical section of the gas producer and the attached vaporizer according to the invention;

Figure 2 is a cross-section on the line A—B of Figure 1;

Figure 3 is a vertical section of a modified construction of the gas producer; and Figure 4 is a cross-section on the line C—D of Figure 3.

Referring to Figures 1 and 2, the gas producer comprises a metal casing 1 provided at 2 with the refractory lining of the gas generating chamber, and at 3 with the grate; it is closed below by the drop-door 4. Above the receptacle 1 is placed the gas outlet suction box 5, which in turn carries a member 6 constituting a fuel reservoir, and a charging hopper 7, of the kind usually employed in suction gas producers.

The refractory lining 2 constitutes one of the characteristics of the invention. Instead of being made in a single piece, as is generally done, it is made up of a certain number of members in the form of segmental blocks with vertical joints as shown in Figure 2; these refractory members have bevelled upper and lower ends which abut, on the one hand, against a lower angle-iron 8 and, on the other hand, against the frustoconical bottom wall of the suction box 5.

The receptacle 1 is attached to the box 5 by means of bolts 9, which permit of clamping the refractory members between the two conical supporting surfaces. In order to facilitate the clamping of the refractory members, a sheet of asbestos 2′, from 5 to 10 mm. thick, is interposed between each member and between the members and the clamping surfaces, in such manner as to secure the joints, and to prevent contact of the refractory members with the metallic members. There is thus obtained a gas producer resistant to shocks and easy of repair in cast of breakdown, since it suffices to unscrew the bolts 9 and separate the upper and lower members of the casing, so that both are accessible for adjustment or repairs.

A modification of the construction of the gas generating chamber is shown in Figures 3 and 4. In this case, the refractory portion of the chamber is replaced by a metal member 10, as shown in these figures; this metal member is made of nichrome, a highly refractory metal, and resisting fire well. This member 10 is provided with fins 10′ on its outer periphery to give it rigidity; it is attached by its upper part to the lower part of the suction box 5.

To produce producer gas suitable for supplying internal combustion engines, it is necessary to mix with the air sent into the grate a certain quantity of steam, which, on being dissociated, yields hydrogen and oxygen. The quality of the gas produced depends largely on the quantity of steam sent into the air. In order to obtain a constant proportion of steam, and, if necessary, to vary it according to the fuel used, a vaporizer is constituted by the arrangement shown in Figure 1. It consists of a cylindrical, oval or rectangular receptacle 11 containing water, and closed above by the lid 12 and below by the partitioned box 13; it is in fact a small boiler open to the atmosphere.

An admission branch 14 for the gases is attached to the upper part of the receptacle; this branch is provided with two concentric tubes 15 and 16 attached by their bottom ends to different partitions, as shown in the figure, in such way as to completely isolate from each other the annular and central passages formed by these tubes. The bottom box 13 is divided into three compartments: firstly a compartment 17 for the admission of the gases; secondly a compartment 18 for the admission of the air; and thirdly a compartment 19 for the outlet of the gases. The compartments 17 and 19 are put into communication with each other by a set of inverted tubes, the outer tube 20 being attached to the outer wall and the inner tube 21 to the inner wall.

The apparatus is completed by an automatic float water-level regulating device comprising a chamber 22 attached to the receptacle 11 by two branches. This chamber contains a float 23, carrying a needle valve 24, which can close the water inlet 25, when the level in the chamber rises. It is therefore possible to keep the level in the receptacle 11 constant, and consequently to have a regular production of steam in this receptacle. The lower part of the float 23 carries a spring 26, the other end of which is connected to a rod 27. By operating this rod, it is possible to accelerate or delay the moment when the needle closes the water inlet and consequently to keep the water level in the receptacle higher or lower. If the water level is higher, the surface of the tubes in contact with the water will be greater and the production of steam more abundant; the contrary will occur if the level is lower.

The operation of the gas producer and of its vaporizer is as follows: The gases are drawn by the engine from the branch 28; this suction creates a suction in the whole plant and external air enters the receptacle 11 by the branch 29 located on the lid 12; this air mixed with the steam produced in 11 descends through the tube 16, reaches the bottom of the gas generating chamber, passes through the layer of incandescent coal and gasifies it, and the gas produced passes through the openings 30 into the suction box 5, reaches the branch 14, descends through the annular space between the tubes 15 and 16, then circulates through the tubes 20 and 21, giving up its heat and producing steam. It passes then to the purifying apparatus through the branch 28.

What I claim is:

1. A gas producer comprising a lower gas generating chamber having a grate therein and a downwardly and inwardly inclined annular flange above said grate, a gas outlet suction box removably secured to the top of said chamber and having a frusto-conical bottom wall, and a refractory lining including segmental blocks having bevelled ends and interposed packings of asbestos clamped between the frusto-conical bottom of the suction box and the inclined flange.

2. A gas producer comprising a lower gas generating chamber having a grate therein and a downwardly and inwardly inclined annular flange above the grate, a gas outlet suction box removably secured to the top of said chamber, said suction box including a frusto-conical bottom wall, an inverted frusto-conical top wall and inner and outer peripheral walls forming an annular chamber connected to the lower chamber by openings through the bottom wall of the suction box, a fuel hopper mounted on the suction box, and a refractory lining including segmental blocks having bevelled ends and interposed packings of asbestos clamped between the frusto-conical bottom of the suction box and the inclined flange.

In testimony whereof I affix my signature.

LÉON SAIVES.